United States Patent
Fausett et al.

(10) Patent No.: US 10,112,725 B2
(45) Date of Patent: Oct. 30, 2018

(54) ELECTRICALLY HEATED FILTER SCREENS

(71) Applicant: United Technologies Corporation, Hartford, CT (US)

(72) Inventors: Taylor Fausett, San Diego, CA (US); Patrick M. Wasson, El Cajon, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 387 days.

(21) Appl. No.: 14/901,919

(22) PCT Filed: Jun. 6, 2014

(86) PCT No.: PCT/US2014/041262
§ 371 (c)(1),
(2) Date: Dec. 29, 2015

(87) PCT Pub. No.: WO2015/002716
PCT Pub. Date: Jan. 8, 2015

(65) Prior Publication Data
US 2016/0311552 A1    Oct. 27, 2016

Related U.S. Application Data

(60) Provisional application No. 61/842,575, filed on Jul. 3, 2013.

(51) Int. Cl.
*B64D 37/32* (2006.01)
*B01D 35/18* (2006.01)
(Continued)

(52) U.S. Cl.
CPC .......... *B64D 37/32* (2013.01); *B01D 35/005* (2013.01); *B01D 35/18* (2013.01); *B64D 37/34* (2013.01);
(Continued)

(58) Field of Classification Search
None
See application file for complete search history.

(56) References Cited

U.S. PATENT DOCUMENTS

| 1,127,281 A | 2/1915 | Read | |
| 2,464,047 A * | 3/1949 | Larkin | F02M 1/00 123/549 |

(Continued)

FOREIGN PATENT DOCUMENTS

| EP | 0785396 A1 | 7/1997 |
| EP | 0798949 A2 | 10/1997 |

(Continued)

OTHER PUBLICATIONS

European Search Report for Application No. 14819352.7-1808; dated Feb. 6, 2017; 8 pgs.

(Continued)

*Primary Examiner* — Robert J Popovics
(74) *Attorney, Agent, or Firm* — Cantor Colburn LLP

(57) ABSTRACT

A heating body for an electrically heated filter screen includes a heater element having an outer surface and a metallic protective layer having an inner surface. An insulating layer is disposed between the heater element outer surface and the inner surface of the metallic layer. The metallic layer and an exposed portion of the insulating layer define an exterior of the heating body. An electrically heated filter screen constructed from pairs of intersecting heating bodies is also described.

13 Claims, 4 Drawing Sheets

(51) Int. Cl.
- *B01D 35/00* (2006.01)
- *B64D 37/34* (2006.01)
- *F02C 7/224* (2006.01)
- *H05B 3/16* (2006.01)

(52) U.S. Cl.
CPC .............. *F02C 7/224* (2013.01); *H05B 3/16* (2013.01); *H05B 2203/024* (2013.01)

(56) References Cited

U.S. PATENT DOCUMENTS

| | | | | |
|---|---|---|---|---|
| 2,680,345 | A * | 6/1954 | Frost | B64D 15/02 244/134 C |
| 3,612,744 | A * | 10/1971 | Thomas | H01B 7/0838 174/117 FF |
| 3,700,825 | A * | 10/1972 | Taplin | H01B 7/08 174/113 R |
| 5,484,122 | A * | 1/1996 | DeSalve | B64D 13/00 244/117 A |
| 5,642,718 | A | 7/1997 | Nakai et al. | |
| 6,706,183 | B2 | 3/2004 | Ito et al. | |
| 8,038,872 | B2 * | 10/2011 | Jokschas | B01D 27/08 210/184 |
| 8,282,819 | B2 * | 10/2012 | Parra Navarrete | B01D 35/18 210/184 |
| 8,641,896 | B2 * | 2/2014 | Remacha | B01D 35/18 210/184 |
| 9,699,833 | B2 * | 7/2017 | Broughton | F02C 7/12 |
| 9,808,750 | B2 * | 11/2017 | Klein | B01D 35/18 |
| 2002/0079265 | A1 | 6/2002 | Ito et al. | |
| 2002/0141910 | A1 * | 10/2002 | Adiletta | B01D 46/0024 422/171 |
| 2003/0215372 | A1 * | 11/2003 | Ose | B01D 46/0024 422/174 |
| 2005/0178861 | A1 | 8/2005 | Sugiyama | |
| 2008/0197064 | A1 * | 8/2008 | Blasco Remacha | B01D 35/18 210/184 |
| 2012/0076699 | A1 | 3/2012 | Ishihara | |
| 2012/0324859 | A1 * | 12/2012 | Foster | F02C 7/224 60/39.01 |
| 2013/0160461 | A1 * | 6/2013 | Broughton | F02C 7/12 60/796 |
| 2013/0232989 | A1 * | 9/2013 | Osorio | F02C 7/224 60/779 |
| 2013/0283811 | A1 * | 10/2013 | Potel | F02C 7/22 60/776 |
| 2014/0175027 | A1 * | 6/2014 | Fausett | B01D 35/18 210/774 |
| 2016/0031566 | A1 * | 2/2016 | Ribarov | F02M 37/221 210/149 |
| 2016/0230669 | A1 * | 8/2016 | Selstad | F02C 7/224 |
| 2016/0265438 | A1 * | 9/2016 | Keeler | F02C 7/14 |
| 2016/0273455 | A1 * | 9/2016 | Fausett | B64D 41/00 |
| 2016/0281656 | A1 * | 9/2016 | Alecu | F02C 7/224 |
| 2016/0298547 | A1 * | 10/2016 | Ripley | F02C 7/224 |
| 2016/0311542 | A1 * | 10/2016 | Mackin | B64D 15/08 |
| 2016/0311552 | A1 * | 10/2016 | Fausett | B64D 37/34 |
| 2017/0021292 | A1 * | 1/2017 | Turcotte | F02C 7/22 |
| 2018/0016986 | A1 * | 1/2018 | Cordatos | F02C 7/224 |

FOREIGN PATENT DOCUMENTS

| | | |
|---|---|---|
| EP | 2607651 A2 | 6/2013 |
| JP | 932678 A | 2/1998 |
| JP | 11347416 A | 12/1999 |
| JP | 2005226557 A | 8/2005 |
| KR | 1020100079634 A | 7/2010 |

OTHER PUBLICATIONS

International Search Report for International Application No. PCT/US2014/041262.
Written Opinion for International Application No. PCT/US2014/041262.
English Translation for JP 2005226557 Abstract.
English Translation for KR1020100079634 Abstract.
English Translation for JP11-347416 Abstract.
English Translation for JP 9-32678 Abstract.

\* cited by examiner

ELECTRICALLY HEATED FILTER SCREENS

RELATED APPLICATIONS

This application claims the benefit of and priority to U.S. Provisional Patent Application No. 61/842,575 filed Jul. 3, 2013, the contents of which are incorporated herein by reference in their entirety.

BACKGROUND OF THE INVENTION

1. Field of the Invention

The present disclosure relates to electrically heated filter screens, and more particularly to electrically heated filter screens with metal protective layers for aircraft fuel systems.

2. Description of Related Art

Gas turbine engine fuel systems operate in wide range of environmental conditions. In extremely cold operating environments such fuel systems are susceptible to ice formation in fuel tanks, conduits, valves, and other system components. Ice formation can occur when either fuel or water contaminating the fuel is exposed to low temperature for extended time periods.

To combat icing, electrically heated filter screens can be provided within the fuel system. Electrically heated filter screens operate to capture and melt ice conveyed through the fuel system prior to it becoming lodged in the system and affecting engine operation. Conventional electrically heated filter screens may include a heater element coated with a ceramic layer. The ceramic layer functions to electrically insulate the heater element from fuel flowing through the screen and to provide efficient thermal conductivity between the heater element and fuel traversing the electrically heated filter screen.

Conventional electrically heated filter screens have generally been considered satisfactory for their intended purpose. However, there is a need for electrically heated filter screens resistant to damage from ice, contamination and debris entrained in fuel as it flows through the fuel system. There also remains a need for electrically heated filter screens that are easy to make and use. The present disclosure provides a solution for these problems.

SUMMARY OF THE INVENTION

The subject disclosure is directed to a new and useful heating body for an electrically heated filter screen (EHFS). The heating body includes a heater element, a metallic layer, and an insulating layer disposed between a surface of the heater element and an inner surface of the metallic layer. The insulating layer electrically insulates the heater element from the environment external to the heating body. The metallic layer and an exposed portion of the insulating surface define an exterior surface of the heating body, the metallic layer further defining an exterior surface portion opposite the exposed surface portion of the insulating layer.

In embodiments, the insulating layer defines an annular cross-sectional shape disposed about a circumference of the heater element. It is contemplated that the metallic layer form an upstream face of the heating body and that the exposed surface portion of the insulating layer face form a downstream face of the heating body.

The metallic layer can be in direct physical contact with the insulating layer, and the insulating layer can be in direct physical contact with the heater element. It is contemplated that the heater element is thermally communicative with environment external to the heating body through the insulating layer and metallic layer.

A cross-sectional area of the heating body defines lateral and axial widths substantially orthogonal with respect to one another. In embodiments, the lateral width is greater than the axial width. In embodiments, the axial width of the heating body is greater than its lateral width.

An EHFS is also provided. The EHFS includes a first heating body pair and a second heating body pair arranged at angle to, and coupled with, the first heating body pair. An aperture is defined through the EHFS between intersections of the first heating body pair and the second heating body pair. It is contemplated that metallic layers of the heating bodies face of the first and second heating body pairs face a common direction to form an upstream face of the EHFS. Opposite exposed surface portions of the insulating layers of the first and second heating body pairs form a downstream face of the EHFS. In embodiments, each heating body of the first heating body pair is parallel with respect to the other. In certain embodiments, the second heating body pair is orthogonal with respect to the first heating body pair.

The EHFS can be captive in a union fluidly coupling adjacent upstream and downstream fuel conduits. It is contemplated that the metallic layer of the heating bodies face upstream, into fuel flowing from the upstream conduit and into the downstream conduit, and that the EHFS be configured and adapted to melt ice entrained in the fuel flow as well as protect the insulating layer and heating element from impact of ice particles entrained in the fuel flow.

In accordance with certain other embodiments, these and other features of the systems and methods of the subject disclosure will become more readily apparent to those skilled in the art from the following detailed description of the preferred embodiments taken in conjunction with the drawings.

BRIEF DESCRIPTION OF THE DRAWINGS

Preferred embodiments thereof will be described in detail herein below with reference to certain figures, wherein.

DETAILED DESCRIPTION OF THE PREFERRED EMBODIMENTS

Figure 1:
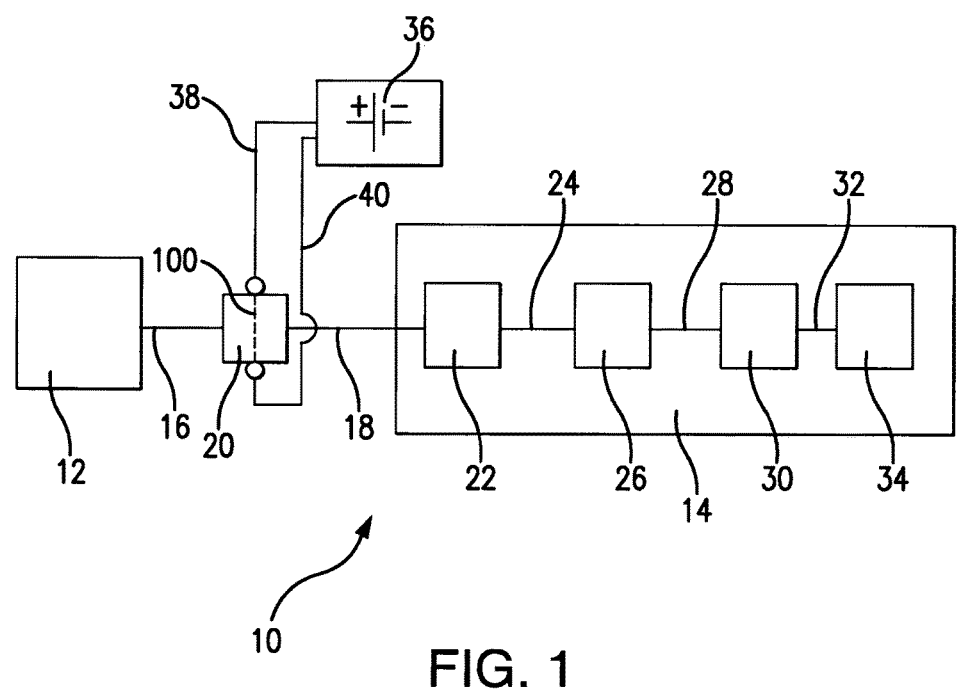
FIG. 1 is a schematic view of a fuel system for a gas turbine engine, according to an embodiment.

Reference will now be made to the drawings wherein like reference numerals identify similar structural features or aspects of the subject disclosure. For purposes of explanation and illustration, and not limitation, a partial view of an exemplary embodiment of an electrically heated filter screen (EHFS) in accordance with the disclosure is shown in FIG. 1 and is designated generally by reference character 100. Other embodiments in accordance with the disclosure, or aspects thereof, are provided in other figures, as will be described. The system of the disclosure can be used for gas turbines such as aircraft main and auxiliary power unit (APU) engines. As will be appreciated embodiments of the EHFS disclosed herein are also suitable for use in marine or terrestrial gas turbines.

With reference to FIG. 1, a fuel system 10 for an aircraft is shown. Fuel system 10 includes a fuel tank 12 fluidly coupled to a turbojet fuel system 14 by a conduit 16, a union 20, and a conduit 18. Conduit 16 is arranged upstream of union 20 and fluidly couples fuel tank 12 to union 20. Conduit 18 is arranged downstream and fluidly couples union 20 to turbojet fuel system 14. Turbojet fuel system 14 includes a heat exchanger 22 coupled to a fuel module 26 by a conduit 24, a fuel manifold 30 coupled by a conduit 28 to fuel module 26, and a combustor 34 coupled to fuel manifold 30 by a conduit 32. As will be appreciated, fuel module 26 can include additional elements such fuel pumps, fuel solenoids, and fuel filters (not shown), and can be for either an aircraft main engine or APU. As will also be appreciated, other fuel system configurations having other components are possible and are within the scope of the present disclosure.

Union 20 includes EHFS 100. EHFS 100 is arranged in union 20 such that fuel flowing from upstream of union 20 traverses EHFS 100. Electrical leads 38 and 40 electrically connect EHFS 100 to turbojet or aircraft electronics 36. Aircraft electronics 36 can include a power source, such as a DC or AC power supply for example. In an embodiment, EHFS 100 is operatively coupled to a DC power bus of an aircraft through aircraft electronics 36.

Fuel flows from fuel tank 12 to turbojet fuel system 14 through a fluid channel defined by conduit 16, union 20, and conduit 18. Fuel arriving at EHFS 100 can be unheated and/or be not filtered to an appropriate level for turbojet fuel system 14. It can also include entrained ice particles. Ice can form within aircraft fuel system 10 from exposure to cold temperatures during flight, and thereafter be mobilized into the fuel flow by system component warming, vibration, or changes in fuel flow rate. Icing can present operation challenges to main engines, such as loss of power due to fuel starvation. Icing can be particularly problematic for APUs which can rest during flight in icing conditions with little or no fuel flow, accumulating ice, and thereafter be activated while in freezing conditions. Portions of aircraft fuel systems leading to APUs are particularly prone to icing due to the tendency of fuel to linger in the system while the APU is idle, such as when the APU is off for an extended period during flight at altitude and exposed to below freezing temperatures.

Once entrained in fuel flow, ice particles can impact and damage internal fuel system components and structures. Ceramic coated EHFS are particularly susceptible to ice damage because ceramic coatings are relatively brittle and chip easily. Ceramics are rendered more vulnerable to impact damage by cold ambient temperatures, such as can be experienced during aircraft flight at extreme altitude. Moreover, operation an EHFS in a mode where it is cycle don and off induces thermal stress due to mismatches between the coefficients of expansion of the heater element and ceramic coating—such as in fuel systems that cycle an EHFS on and off during operation to limit power consumption for example.

Figure 2:
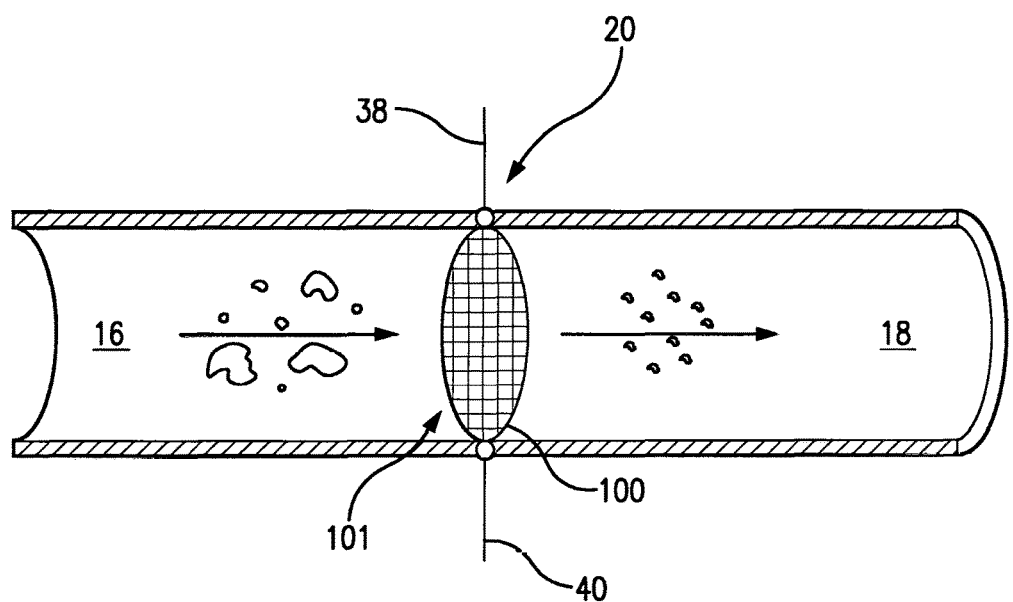
FIG. 2 is a cross-sectional schematic view of a portion of the fuel system of FIG. 1 showing an electrically heated filter screen (EHFS), according to an embodiment.

With reference to FIG. 2, a portion of fuel system 10 is shown including conduit 16, conduit 18, and union 20. EHFS 100 is illustrated in union 20 rotated relative to an axis extending vertically through EHFS 100 to show an upstream face 101 of EHFS 100. As will be appreciated, EHFS 100 also defines a corresponding downstream face (not shown) on its opposite side. EHFS 100 is configured and adapted to screen downstream engine components, such as filters, heaters, pumps and the like from ice particles entrained in fuel flowing from upstream of conduit 16 in the downstream direction and into conduit 18. EHFS 100 is also configured and adapted to melt screened ice that becomes captive on upstream face 101 of EHFS 100 by fuel flowing through EHFS 100. Positioning EHFS 100 in union 20 makes the EHFS accessible for servicing, inspection, cleaning, or replacement. As will be appreciated, one or more EHFS 100 can be arranged at different locations to screen and melt ice prior to its arrival at other fuel system components as is suitable for a given application.

Figure 3:
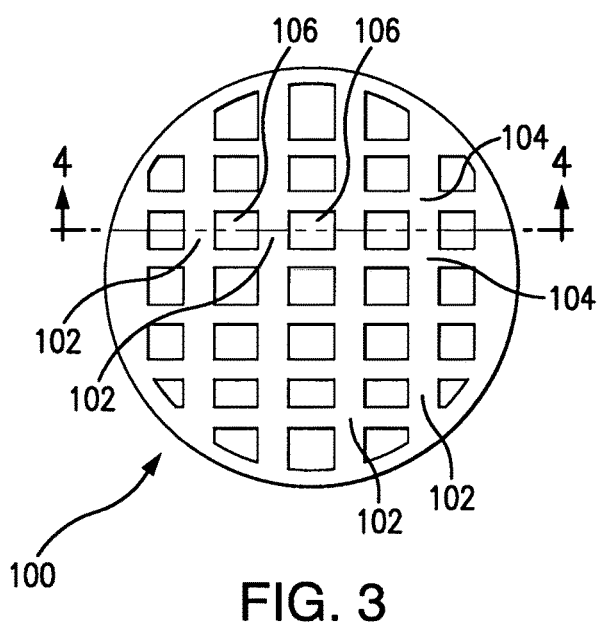
FIG. 3 is a plan view showing a face of the EHFS of FIG. 2, according to an exemplary embodiment.

With reference to FIG. 3, EHFS 100 is shown in plan view. EHFS 100 includes a first heating body pair 102 and a second heating body pair 104, each of the second heating body pair 104 being integrally coupled to each of first heating body pair 102. First heating body pair 102 includes two adjacent heating bodies that extend in parallel with one another along a width of EHFS 100. In embodiments, second heating body pair 104 includes two adjacent heating bodies that are also parallel with one another and integrally coupled to form EHFS 100. An aperture 106 is defined between intersecting first heating body pair 102 and second heating body pair 104, aperture 106 extending through an axial thickness of EHFS 100. In the illustrated embodiment first heating body pair 102 intersects second heating body pair 104 orthogonally, thereby imparting a rectangular shape to aperture 106. As will be appreciated, other angular relationships between first heating body pair 102 and second heating body pair 104 are possible as is suitable for an intended application of EHFS 100. For example, aperture 106 can have a triangular, circular or elliptical shape.

Figure 4:
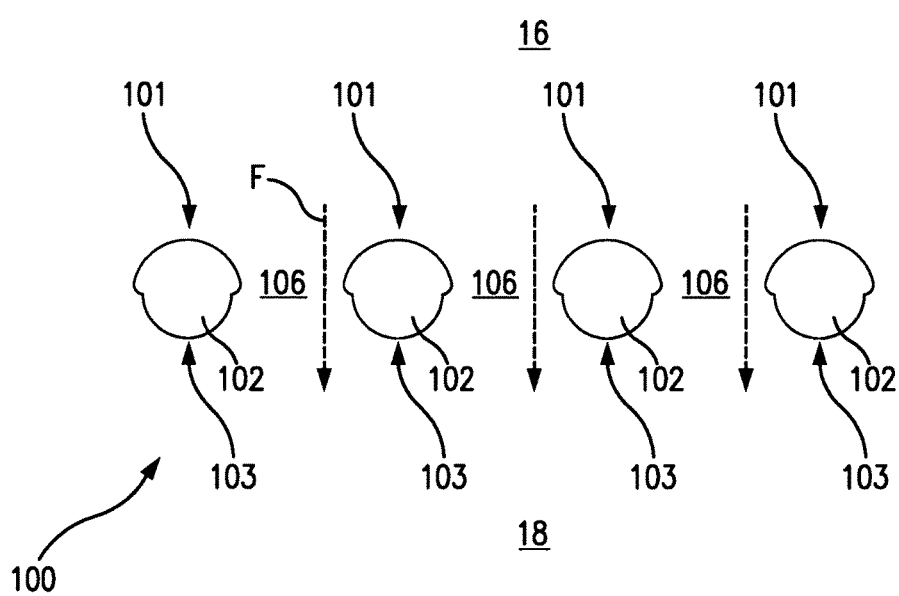
FIG. 4 is a cross-sectional view of the EHFS of FIG. 2 showing profiles of heating bodies of the EHFS of FIG. 2.

With reference to FIG. 4, a cross-sectional view of EHFS 100 is shown. The adjacent heating bodies of first heating body pair 102 respectively define upstream face 101 and downstream face 103 of EHFS 100. A metallic layer 120 (shown in FIG. 5) is included on upstream facing edges of each heating body for protecting the heating bodies from kinetic impact of ice particles (shown in FIG. 2) entrained in fluid flow F as the fluid transits aperture 106 of EHFS 100. Upstream face 101 is configured and adapted to block ice particles of greater size than aperture 106, fixing the particles on the upstream side of EHFS 100 and melting ice by thermally conducting heat into the fluid transiting the screen or ice captive on the upstream side of EHFS 100.

As illustrated by flow arrow F, unfiltered and unheated fuel flows downstream from conduit 16 and transits aperture 106. Ice particles entrained in the fuel flow (shown in FIG. 2) and larger than aperture 106 impact the metal protective layer of heating bodies of first heating body pair 102 and second heating body pair 104 and are urged against upstream face 101 by the force of fuel flowing across EHFS 100. Flowing fuel forces the ice particles against EHFS 100 and abrading the ice particles against the metal layer while heat generated by the EHFS 100 melts ice contacting EHFS 100. Once reduced to size sufficient to transit an aperture the fuel flow sweeps the ice particles through aperture 106 in sizes that are less likely to damage downstream components or impact engine operation. In embodiments, the heating bodies of second heating body pair 104 can have a similar shape and construction as the heating bodies of first heating body pair 102.

Figure 5:
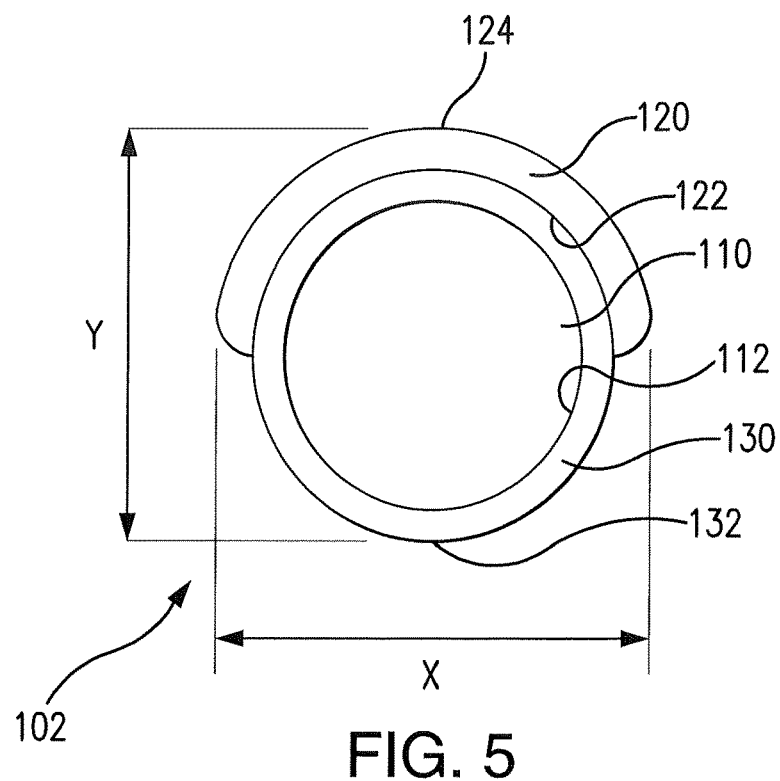
FIG. 5 is a cross-sectional view of one of the heating body profiles of FIG. 4 showing the layers thereof, according to an embodiment.

With reference to FIG. 5, a heating body of heating body pair 102 is shown including a heater element 110, an insulating layer 130, and metallic layer 120. Heater element 110 defines a circular cross-sectional area and has a surface 112. Insulating layer 130 defines an annular cross-sectional area, and has an inner surface opposite surface 112 of heater element 110 and an outer surface 132 circumferentially extending about insulating layer 130. Metallic layer 120 defines an arcuate cross-sectional shape and has an inner surface 122 opposing surface 132 and an exterior surface 124. Metallic layer 124 and the environment external to the heating body are electrically insulated from heater element 110 by insulating layer 130. Heater element 110 is thermally communicative with the environment external to the heating body through insulating layer 130 and metallic layer 120.

Heater element 110 is constructed from a resistive heating material. The resistive material generates heat when an electric current is flowed therethrough. Insulating layer 130 is constructed from an electrically insulating material that has high thermal conductivity, such as a ceramic material, and electrically insulates heater element 110 from the environment external to the heating body while efficiently conducting heat generated by the heating body to the environment external to the heating body. In embodiments, insulating layer 130 directly contacts heater element 110 to efficiently conduct heat from heater element 110. Metallic layer 120 is constructed of a material resistive to impact damage and with high thermal conductivity, and is in direct physical contact with the underlying portion of insulating layer 130. It thereby protects the underlying insulating layer from ice impact damage while efficiently conducting heat generated by heater element 110 to the environment external to heating body. Each of insulating layer 130 and metallic layer 120 are thermally communicative with heater element 110 and the environment external to the heating body. In embodiments, metallic layer 120 is constructed of a material with good thermal conductivity that efficiently conducts heat through metal protective leading edges of upstream face 101 of EHFS 100 and renders the EHFS 100 structurally rigid and better adapted to resist ice impact. In embodiments, metallic layer 120 is in direct physical contact with insulating layer so as to efficiently conduct heat from insulating layer 130 (and underlying heater element 110) to the environment external to the heating body, although one or more intermediate layers of material or adhesive may be layered between the metallic layer 120, the insulating layer 130, and the underlying heater element 110.

Figure 6:
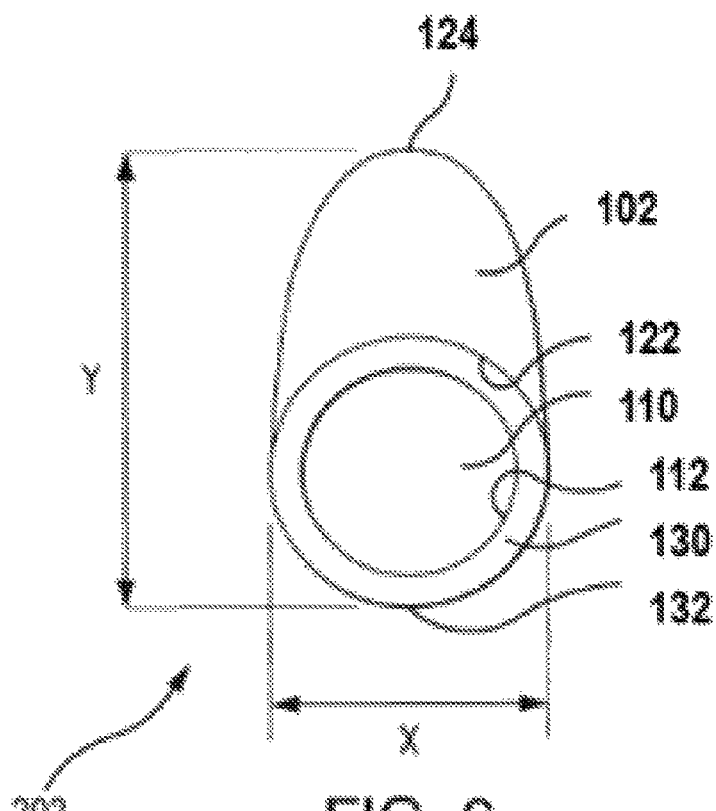
FIG. 6 is a cross-sectional view of another heating body profile having an elongated profile, according to another exemplary embodiment.

With reference to FIG. 6, another embodiment of a heating body 202 is shown. Heating body 202 is similar to heating body 102, and additionally includes an axial width Y that is greater than its lateral width X. In embodiments, heating body 202 provides ice and debris impact protection and efficiently conducting heat into the environment external to heating body with reduced disturbance to fluid flowing across heating body 202.

Embodiments of the EHFS devices described herein protect the leading edge of the ceramic coated heating element in fuel systems using a metallic layer disposed over the leading edges of ceramic coated heating bodies. The metallic layer protects the underlying ceramic layer from chipping and fracturing when impacted by ice moving within a fluid flow transiting the EHFS. In embodiments, the protective layer is in direct physical contact with the insulating layer, providing good thermal conductivity between the layers. Direct physical contact between the layers also prevents contamination from infiltrating an interface defined by respective surfaces of the metallic layer and the insulating layer. Limiting the metal layer to the upstream facing edges of the heating body also reduces any thermal conductivity penalty associated with the metallic layer while providing impact protection for the insulating layer. In embodiments, the metallic layer provides a streamlined heating body contour oriented into the fluid flow, reducing the disturbance created by the structure within the fluid flow. Embodiments of the EHFS also provide improved reliability and longer service life than convention EHFS devices.

The methods and systems of the present disclosure, as described above and shown in the drawings, provide an EHFS with superior properties including control of ice particle flow within a gas turbine fuel system. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An electrically heated filter screen for a fuel system, comprising:
   a first heating body including:
      a first heater element with a surface;
      a first metallic layer with an inner surface; and
      a first insulating layer sandwiched between said first heater element surface and the inner surface of said first metallic layer;
   a second heating body including:
      a second heater element with a surface;
      a second metallic layer with an inner surface; and
      a second insulating layer sandwiched between said second heater element surface and the inner surface of said second metallic layer;
   a filter screen formed by the coupling of said first and second heating bodies, said filter screen having at least one aperture;
   wherein said filter screen is transversely disposed within a fuel line section having an upstream and a downstream relative to said filter screen, each of said insulating layers having an exterior surface that is exposed to flowing fuel and each of said metallic layers extending from said insulating layers in an upstream direction to protect said filter screen from damage caused by objects in the flowing fuel.

2. An electrically heated filter screen as recited in claim 1 wherein the first and second heating bodies are integrally formed.

3. An electrically heated filter screen as recited in claim 1, wherein the first insulating layer has an annular cross-sectional area disposed about the first heating element.

4. An electrically heated filter screen as recited in claim 1, wherein a cross-section of the first heating body defines lateral and an axial widths, the lateral width being orthogonal with respect to the axial width.

5. An electrically heated filter screen as recited in claim 4, wherein the lateral width of the first heating body is greater than the axial width of the first heating body.

6. An electrically heated filter screen as recited in claim 4, wherein the axial width of the first heating body is greater than the lateral width of the first heating body.

7. An electrically heated filter screen as recited in claim 4, wherein a thickness of the first metallic layer is greater along the lateral width than along respective thicknesses along the lateral width.

8. An electrically heated filter screen as recited in claim 1, wherein the first insulating layer circumferentially surrounds the surface of the first heating element.

9. An electrically heated filter screen as recited in claim 1, wherein the metallic layers of the first heating body and the second heating body face in a common direction and define an upstream face of the electrically heated filter screen.

10. An electrically heated filter screen as recited in claim 1, wherein exposed portions of the insulating layers of the first heating body and the second heating body define a downstream face of the electrically heated filter screen.

11. An electrically heated filter screen as recited in claim 1, wherein each heating body is parallel with the other.

12. An electrically heated filter screen as recited in claim 11, wherein the second heating body is orthogonal with respect to the first heating body.

13. An electrically heated filter screen as recited in claim 1, wherein the screen is disposed in a union coupling upstream adjacent downstream fuel conduits.

* * * * *